(12) United States Patent
Moupfouma et al.

(10) Patent No.: US 11,485,470 B2
(45) Date of Patent: Nov. 1, 2022

(54) FLOORING ARRANGEMENT FOR AN AIRCRAFT

(71) Applicant: BOMBARDIER INC., Dorval (CA)

(72) Inventors: Fidele Moupfouma, Beaconsfield (CA); Claude Lavoie, Laval (CA); Mohamed Hassan Elsharkawi, Laval (CA)

(73) Assignee: BOMBARDIER INC., Dorval (CA)

( * ) Notice: Subject to any disclaimer, the term of this patent is extended or adjusted under 35 U.S.C. 154(b) by 198 days.

(21) Appl. No.: 16/891,922

(22) Filed: Jun. 3, 2020

(65) Prior Publication Data

US 2020/0385100 A1 Dec. 10, 2020

Related U.S. Application Data

(60) Provisional application No. 62/856,827, filed on Jun. 4, 2019.

(51) Int. Cl.
*B64C 1/18* (2006.01)
*H02G 3/36* (2006.01)

(52) U.S. Cl.
CPC .............. *B64C 1/18* (2013.01); *H02G 3/36* (2013.01)

(58) Field of Classification Search
CPC .. B64C 1/18; B64C 1/40; B64D 11/00; H02G 3/36
See application file for complete search history.

(56) References Cited

U.S. PATENT DOCUMENTS

| 2,302,003 A | 11/1942 | Cadwell et al. |
| 3,196,315 A | 7/1965 | Peterson |
| 3,582,445 A * | 6/1971 | Okuhashi ................. D06Q 1/04 57/244 |

(Continued)

FOREIGN PATENT DOCUMENTS

| CN | 112027059 A * | 12/2020 | ............. B32B 15/02 |
| DE | 2109724 A1 | 9/1972 | |

(Continued)

OTHER PUBLICATIONS

English Translation of DE2109724 retrieved on Espacenet on Apr. 25, 2019.

(Continued)

*Primary Examiner* — Benjamin P Lee
(74) *Attorney, Agent, or Firm* — BCF LLP

(57) ABSTRACT

A flooring arrangement for an aircraft cabin and an aircraft with the flooring arrangement. The flooring arrangement at least one insulating layer for insulating the cabin; a wire mesh disposed above the at least one insulating layer; a carpet layer disposed above the wire mesh, the carpet layer and the wire mesh being in electrically conductive contact; and at least one resistive element connected to the wire mesh, the wire mesh being structured and arranged for being electrically connected to a conductive structure of the aircraft via the at least one resistive element. The resistive element allows transmission, from the wire mesh to the conductive structure, of electrostatic charges developed on the carpet layer, and impedes transmission, from the conductive structure to the wire mesh, of high current events experienced by the aircraft.

15 Claims, 3 Drawing Sheets

(56) References Cited

U.S. PATENT DOCUMENTS

| | | | | |
|---|---|---|---|---|
| 3,713,960 | A | * | 1/1973 | Cochran, II ............ H05F 3/025 428/95 |
| 3,955,022 | A | * | 5/1976 | Sands ...................... B32B 5/024 428/95 |
| 4,061,811 | A | * | 12/1977 | Takase ................. D06N 7/0042 428/401 |
| 4,269,881 | A | * | 5/1981 | Johnson ................. D02G 3/445 428/95 |
| 4,307,144 | A | * | 12/1981 | Sanders ................. B32B 27/12 428/522 |
| 4,323,946 | A | | 4/1982 | Traux |
| 4,590,535 | A | | 5/1986 | Mang |
| 4,770,916 | A | * | 9/1988 | Leukel .................... E04F 15/02 428/209 |
| 4,934,116 | A | | 6/1990 | Frederiksen |
| 5,160,775 | A | * | 11/1992 | Yamada ................. H05F 3/025 428/95 |
| 5,348,784 | A | * | 9/1994 | Lampert ................. D04H 1/42 428/95 |
| 6,661,120 | B1 | | 12/2003 | Alpini |
| 7,002,786 | B2 | | 2/2006 | Signorino |
| 7,749,603 | B2 | | 7/2010 | Graham et al. |
| 8,264,811 | B1 | | 9/2012 | Green |
| 8,613,406 | B2 | * | 12/2013 | Jones ..................... B60N 3/046 428/920 |
| 8,739,381 | B2 | * | 6/2014 | Jones ..................... B60N 3/042 428/92 |
| 9,119,276 | B2 | | 8/2015 | Coffland |
| 9,969,483 | B2 | | 5/2018 | Roborel De Climens et al. |
| 10,023,291 | B2 | | 7/2018 | Roborel De Climens et al. |
| 10,207,817 | B2 | | 2/2019 | Wang et al. |
| 10,279,886 | B2 | * | 5/2019 | Owens ................. F24D 13/024 |
| 10,714,293 | B1 | * | 7/2020 | Fairchild ................. C08K 3/041 |
| 2009/0233040 | A1 | * | 9/2009 | Baumgartner ............ B32B 5/26 156/60 |
| 2012/0117777 | A1 | * | 5/2012 | Jones ..................... B60N 3/042 29/428 |
| 2016/0121993 | A1 | * | 5/2016 | Nehring ................. B32B 5/245 244/118.5 |
| 2016/0264257 | A1 | | 9/2016 | Han et al. |
| 2018/0273178 | A1 | * | 9/2018 | Ibrahim ................. B60Q 3/745 |
| 2020/0001967 | A1 | * | 1/2020 | Pirner ..................... B32B 5/245 |
| 2020/0156757 | A1 | * | 5/2020 | Coluni ..................... B32B 3/30 |
| 2020/0247543 | A1 | * | 8/2020 | Buller ....................... B64C 1/18 |
| 2020/0369362 | A1 | * | 11/2020 | Lynch ..................... B32B 7/12 |

FOREIGN PATENT DOCUMENTS

| | | | | |
|---|---|---|---|---|
| DE | 2800595 | A1 | * 7/1978 | ............ A47G 27/00 |
| DE | 102007062111 | A1 | 7/2009 | |
| EP | 3747761 | A1 | * 12/2020 | ............ B32B 15/02 |
| GB | 2003791 | A | 3/1979 | |

OTHER PUBLICATIONS

English Abstract of DE102007062111 retrieved on Espacenet on Jun. 3, 2020.

* cited by examiner

FLOORING ARRANGEMENT FOR AN AIRCRAFT

CROSS-REFERENCE

The present application claims priority to U.S. Provisional Patent Application No. 62/856,827, entitled "FLOORING ARRANGEMENT FOR AN AIRCRAFT," filed on Jun. 4, 2019, the entirety of which is incorporated herein by reference.

FIELD OF TECHNOLOGY

The present technology relates to flooring arrangement for a cabin of an aircraft.

BACKGROUND

In aircraft, floors in passenger cabins are often carpeted for comfort and noise reduction. For passengers and crew moving about within such a space, movement across the carpet can cause electrostatic charge to build up on the carpet. If the carpet is not conductive (as is generally the case), the charges cannot flow to the surrounding aircraft structure. Passengers and crew members moving about the cabin on the carpet thus may become charged. In environments with low humidity, such as an aircraft cabin, electrostatic charge build-up can be especially prevalent. Passengers and crew then risk discharging themselves when touching conductive surfaces within the cabin.

Such electrostatic discharge (ESD) can generate an electrical field reaching several kV/m. In addition to being physically uncomfortable for a person experiencing the discharge, damage to electronic systems contacted during discharge within the cabin can occur. Unless otherwise protected against ESD, the functionality of such a system contacted during discharge within the cabin (e.g. computers, cell phones, electrical operational systems of the cabin, etc.) can be temporarily inhibited or even permanently damaged or destroyed.

Various solutions have been proposed to decrease electrostatic charge build-up on cabin carpeting. For example, this issue has been addressed by application of anti-static treatments (generally spray) to carpets. While the anti-static treatment prevents electrostatic charge build-up on the carpet, regular cleaning of the carpet can reduce the efficacy of the anti-static treatment or even remove the anti-static treatment from the carpet completely. As the carpeting of aircraft is likely to undergo regular, vigorous cleaning, the anti-static treatment will need to be re-applied regularly in order to prevent ESD effects over the long-term. As the anti-static treatment is often a chemical product in spray form, application of the anti-static treatment may face environmental constraints. This is thus not generally an economical, nor ecological solution.

Consequently, there is a desire for a solution which aids in preventing or reducing electrostatic discharge within an aircraft cabin but without at least some of the above drawbacks.

SUMMARY

It is an object of the present technology to ameliorate at least some of the inconveniences present in the prior art.

According to one aspect of the present technology, there is provided a flooring arrangement to aid in reducing and/or preventing electrostatic discharge within an aircraft cabin.

The present detailed description refers to an aircraft cabin environment, but the present technology can apply to other environments where the flooring build-up and the static electricity issues could be eliminated.

In the present technology, a lightweight wire mesh is included in the flooring, in contact with an underside of the carpet and bonded to an aircraft structure through a jumper in order to provide a conductive path for static charges to bleed off through an aircraft common ground. Accumulated charges from the carpeting are allowed to discharge to the common ground within the aircraft, preventing passengers from becoming charged when in contact with the flooring (specifically electrically-insulating carpeting). Between the wire mesh contacting the underside of the carpet and the grounded portion of the aircraft are included two resistors in series with the jumper, at opposite extremities of the wire mesh. The resistance configuration allows charges built-up on the carpet to bleed to the ground, while also impeding electricity impacting on the aircraft (e.g. lightning strikes) from conducting back through the wire mesh into the cabin.

According to an aspect of the present technology, there is provided a flooring arrangement for a cabin of an aircraft. The flooring arrangement includes at least one insulating layer for insulating the cabin; a wire mesh disposed above the at least one insulating layer; a carpet layer disposed above the wire mesh, the carpet layer and the wire mesh being in electrically conductive contact; and at least one resistive element connected to the wire mesh, the wire mesh being structured and arranged for being electrically connected to a conductive structure of the aircraft via the at least one resistive element.

In some embodiments, when the flooring arrangement is installed in the aircraft, the at least one resistive element is adapted to: allow transmission, from the wire mesh to the conductive structure, of electrostatic charges developed on the carpet layer, and impede transmission, from the conductive structure to the wire mesh, of high current events experienced by the aircraft.

In some embodiments, the at least one resistive element includes: a first resistor electrically connected at a first location on the wire mesh; and a second resistor electrically connected at a second location on the wire mesh, the first location and the second location being disposed on opposite ends of the wire mesh.

In some embodiments, the first location and the second location are diametrically opposing corners of the wire mesh.

In some embodiments, the at least one resistive element has a resistance of at least about one mega-ohm.

In some embodiments, the at least one resistive element has a resistance equal to or less than about five mega-ohms.

In some embodiments, the at least one insulating layer includes at least one damping layer.

In some embodiments, the flooring arrangement further includes at least one waterproof membrane disposed below the wire mesh.

According to another aspect of the present technology, there is provided an aircraft includes a fuselage defining a cabin therein; and a pair of oppositely disposed wing assemblies connected to the fuselage. The fuselage includes a conductive structure; and a flooring arrangement for the cabin, the flooring arrangement including at least one insulating layer for insulating the cabin; a wire mesh disposed above the at least one insulating layer; a carpet layer disposed above the wire mesh, the carpet layer and the wire mesh being in electrically conductive contact; and at least one resistive element connected to the wire mesh, the wire mesh being electrically connected to a conductive structure of the fuselage through the at least one resistive element.

In some embodiments, the at least one resistive element is adapted to: allow transmission, from the wire mesh to the conductive structure, of electrostatic charges developed on the carpet layer, and impede transmission, from the conductive structure to the wire mesh, of high current events experienced by the aircraft.

In some embodiments, the conductive structure includes at least portions of the fuselage.

In some embodiments, the at least one resistive element includes a first resistor electrically connected at a first location on the wire mesh; and a second resistor electrically connected at a second location on the wire mesh, the first location and the second location being disposed on opposite sides of the wire mesh.

In some embodiments, the first location and the second location are diametrically opposing corners of the wire mesh.

In some embodiments, the at least one resistive element has a resistance of at least about one mega-ohm.

In some embodiments, the at least one resistive element has a resistance equal to or less than about five mega-ohms.

In some embodiments, the at least one insulating layer of the flooring arrangement includes at least one damping layer.

In some embodiments, the flooring arrangement further comprises at least one water-resistant membrane disposed below the wire mesh.

As used herein, the term "about" in the context of a given value or range refers to a value or range that is within 10% of the given value or range.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description and the accompanying drawings.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not drawn to scale, unless otherwise noted.

DETAILED DESCRIPTION

The present technology will now be described in connection with one or more embodiments. The discussion of any one particular embodiment or associated feature is not intended to be limiting of the present invention. To the contrary, the discussion of particular embodiments and features is intended to illustrate the breadth and scope of the present invention. There are numerous variations and equivalents that will be made apparent from the discussion that follows. Those variations and equivalents are intended to be encompassed by the scope of the present invention as if described herein.

With respect to various features that are discussed in connection with specific embodiments, it is noted that the features are not intended to be exclusive of one another. To the contrary, as should be apparent to those skilled in the art, several of the features may be combinable in arrangements that differ from the specific embodiments described below. Those combinations are contemplated to fall within the scope of the present invention.

The present technology will be described with respect to aircraft, but it is contemplated that all or some of the aspects of the technology could be applied to other passenger vehicles, including but not limited to: trains, automobiles, and ships. It should also be noted that the term "passenger" as used herein is meant to refer to any person traveling within an aircraft or other vehicle, including but not limited to, any traveler, rider, driver, pilot, operator, staff or crew member, and the like.

Figure 1:
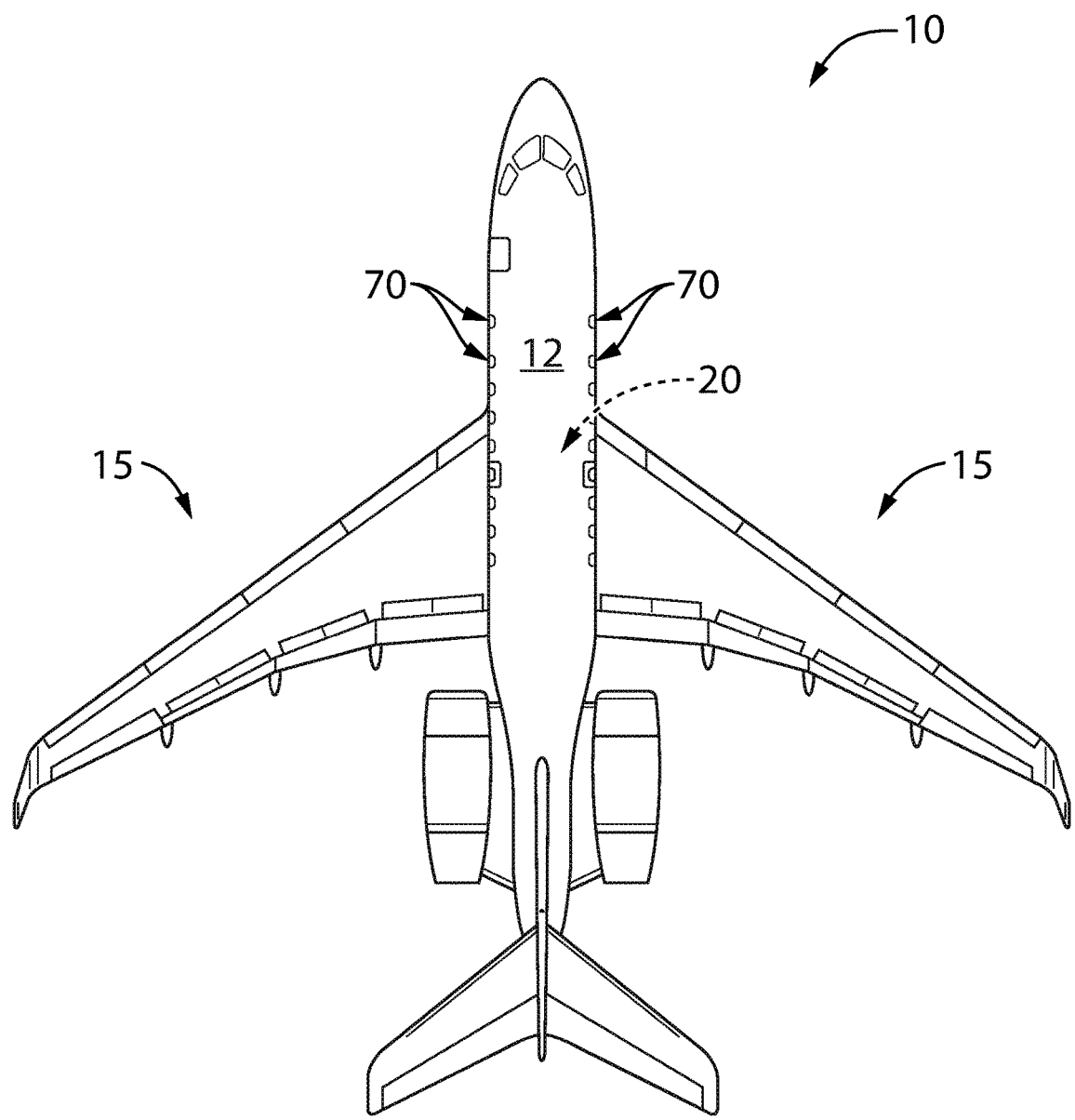
FIG. 1 is a top plan view of an aircraft.

FIG. 1 shows a top view of a fixed-wing jet aircraft 10 according to the present technology. The aircraft 10 includes a fuselage 12 (the body of the aircraft 10). Connected to the fuselage 12 are two oppositely disposed wing assemblies 15, also referred to herein as wings 15. The wings 15 produce lift and therefore flight of the aircraft 10 during operation. The illustrated aircraft 10 is simply an example of an aircraft implementing an embodiment of the present technology; it is not meant to be limiting.

Figure 2:
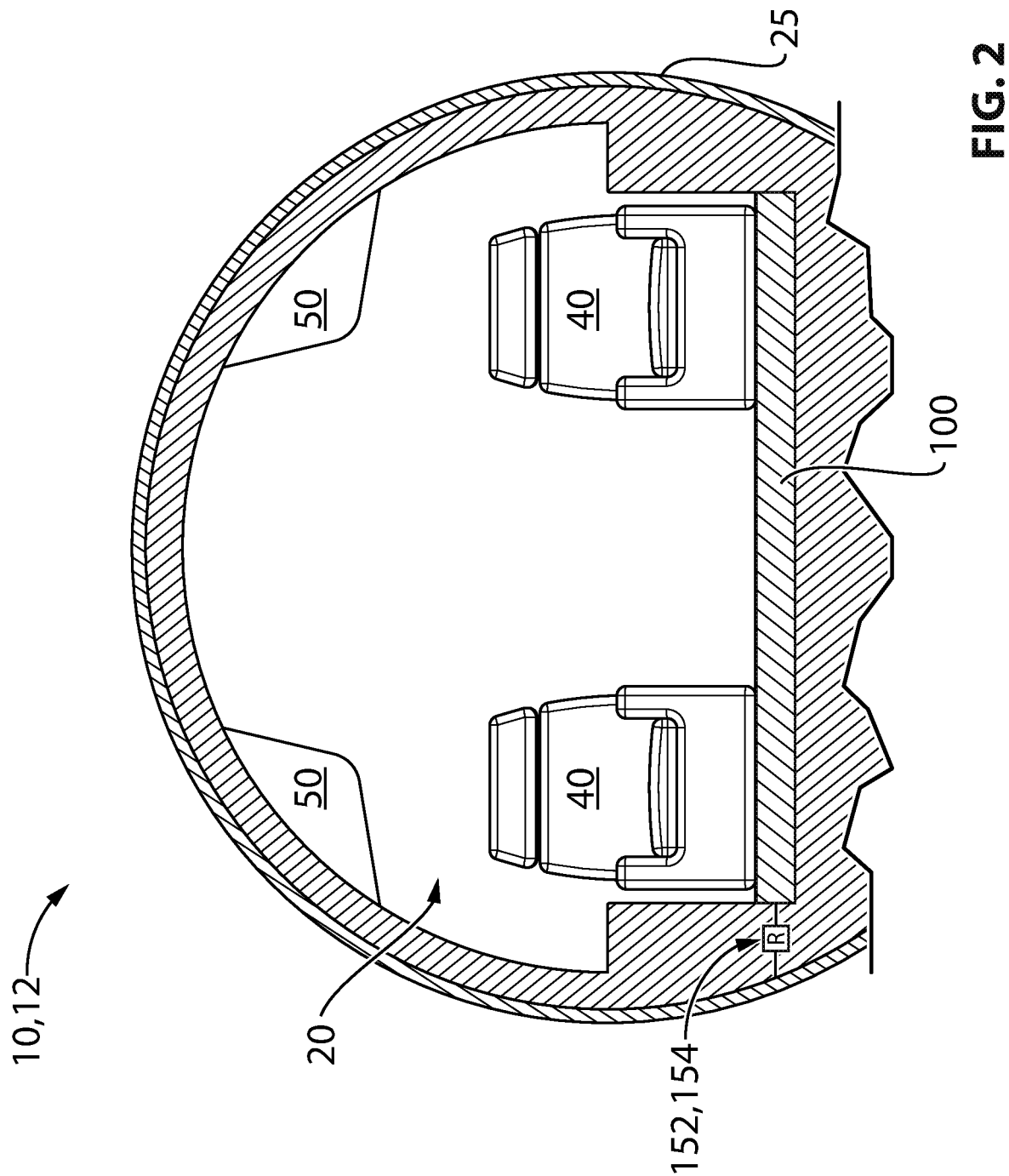
FIG. 2 is a cross-sectional view of a portion of a passenger cabin of the aircraft of FIG. 1.

The fuselage 12 is partially formed from a frame structure 25, schematically illustrated in FIG. 2 as a shell structure of the fuselage 12. The frame structure 25 provides part of the structural integrity of the fuselage 12 and the aircraft 10. The frame structure 25 is formed from aluminum, although different conductive materials could be used, including but not limited to composite materials. As the frame structure 25 is a relatively large conductive structure 25, extending along the length of the fuselage 12 and being made of a conductive material, the frame structure 25 generally serves as electrical grounding for various systems in the aircraft 10. It is contemplated that grounding could be provided by a signal or current return network in embodiments where the aircraft 10 is formed from a composite material.

Within the fuselage 12 is defined a passenger cabin 20, also referred to as a cabin 20, portions of which are illustrated in FIG. 2. There are a plurality of passenger seats 40 in the cabin 20. The number and relative orientations of the seats 40 depend on the specific embodiment, and are not limited to the arrangement illustrated in the Figures. The fuselage 12 includes a plurality of windows 70 extending through to the passenger cabin 20 (FIG. 1). The cabin 20 could include more or fewer windows 70 than is illustrated in the Figures, depending on the specific embodiment of the aircraft 10.

The cabin 20 includes a plurality of storage bins 50 disposed generally above the passenger seats 40. The number and form of the storage bins 50 depend on the specific embodiment, and are not limited to the arrangement illustrated in the Figures. In some embodiments, the storage bins 50 could be omitted.

Depending on the specific embodiment, the cabin 20 could further include additional features, including but not limited to: tables, passenger service items such as window shades, lighting systems, air control systems, sound systems, crew communication systems, and entertainment or media systems.

Figure 3:
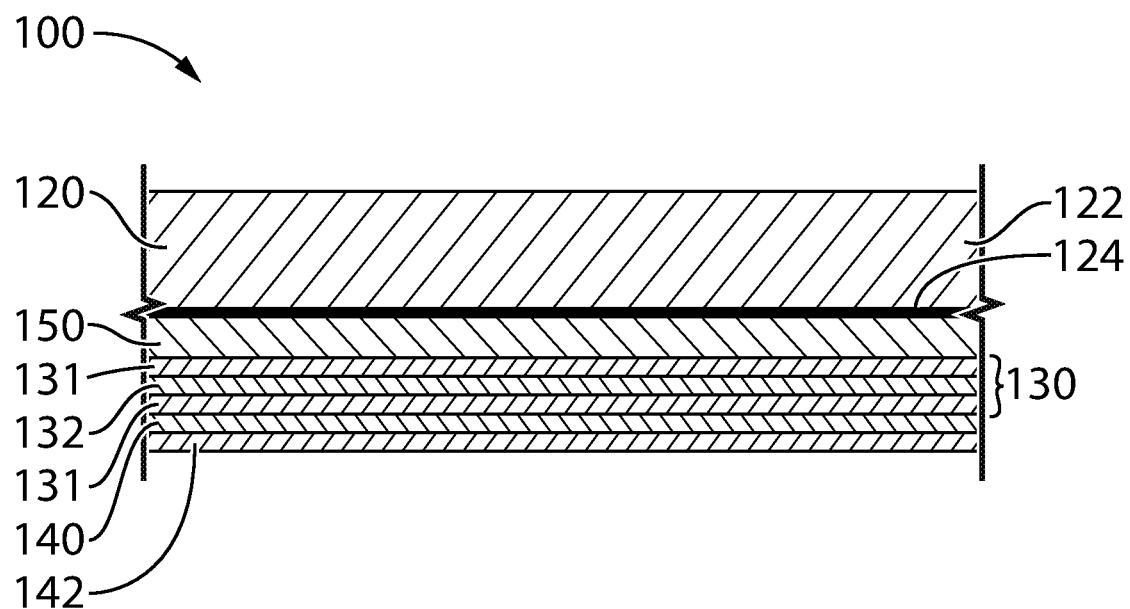
FIG. 3 is a cross-sectional, schematic view of a flooring arrangement of the passenger cabin of FIG. 2.

According to the present technology, the cabin 20 further includes a flooring arrangement 100. With further reference to FIG. 3, the flooring arrangement 100 provides a floor surface on which passengers can walk about the cabin 20, as well as a plurality of insulating layers for insulating the cabin 20 from noise produced below the cabin 10 and outside the fuselage 12. While only one flooring arrangement 100 is described as providing flooring in the cabin 20, it is contemplated that a plurality of flooring arrangements 100 could be included in any given cabin 20.

The flooring arrangement 100 includes a carpet layer 120, with which passengers' feet in the cabin 20 are in contact. The carpet layer 120 is a top-most layer of the flooring arrangement 100. The carpet layer 120 includes a carpet fabric layer 122 on top side of the carpet layer 120 and a carpet backing 124 to provide stiffness and durability to the carpet fabric layer 122.

The carpet fabric layer 122 is formed from a mixture of natural and artificial fiber materials, specifically wool and nylon. Depending on the specific embodiment, the carpet fabric layer 122 could be made from one or a mixture of different materials, including but not limited to wool and nylon. The carpet backing 124 is a flame retardant synthetic latex mesh to which the carpet fabric layer 122 is weaved. Depending on the embodiment, the carpet backing 124 could instead be glued or otherwise attached to the carpet fabric layer 122. It is contemplated that the carpet backing 124 could be made from one or more different materials, depending on the embodiment. It is further contemplated that the carpet fabric layer 122 and the carpet backing 124 could be integrally connected, where the carpet fabric layer 122 is fused to and extends upward form the carpet backing 124.

The flooring arrangement 100 includes several insulating and protective layers between the carpet layer 120 and the structural surface of the fuselage 12 extending under the cabin 20. As is mentioned above, the insulating layers aid in insulating the interior space of the cabin 20 from noise below the cabin 20 and from outside of the fuselage 12. It is contemplated that the flooring arrangement 100 could include more or fewer insulating layers than is described below for the present embodiment.

According to the illustrated embodiment schematically displayed in FIG. 3, the flooring arrangement 100 includes, in descending order from beneath the carpet layer 120: a wire mesh 150, an underlay composition 130, a water-proof membrane 140, and a damping layer 142. It is contemplated that the flooring arrangement 100 could include additional layers depending on the specific embodiment. It is also contemplated that details of the underlay composition 130, the water-proof membrane 140, and/or the damping layer 142 could vary depending on the embodiment. It is also contemplated that the order of the various layers 130, 140, 142 could vary depending on the embodiment. The wire mesh 150, disposed immediately below the carpet layer 120, will be described in more detail below.

The underlay composition 130 provides cushioning under the carpet layer 120 for comfort of the passengers, as well as vibrational and acoustic isolation from the structure of the fuselage 12 below the cabin 20 and from the exterior of the aircraft 10. In the present embodiment, the underlay composition 130 is formed from three non-conductive layers: two underlay layers 131 and a vinyl isolator layer 132 sandwiched therebetween. The underlay layers 131 are fabricated from silicone foam, but different embodiments could use one or more different materials.

Immediately below the underlay composition 130 is the waterproof membrane 140. The flooring arrangement 100 includes the water-proof membrane 140 to aid in impeding water infiltrations or condensation from below the flooring arrangement 100. In some cases, the waterproof membrane 140 could aid in preventing condensation occurring on the damping layer 142 from reaching the carpet layer 120 and seeping into the cabin 20. Similarly, the water-proof membrane 140 aids in impeding water spills or infiltrations from within the cabin 20 from reaching areas of the fuselage 12 under the flooring arrangement 100.

In the present embodiment, the waterproof membrane 140 is formed from a thin sheet of polyurethane, although this is simply one non-limiting example. It is contemplated that other membranes could be used, depending on the specific embodiment. In some embodiments, it is also contemplated that the water-proof membrane 140 could be omitted. In some cases, another layer of the flooring arrangement 100 could be water-proof or could integrally include a waterproof membrane or material. While the layer 140 is specifically water-proof in the present embodiment, it is contemplated that the layer 140 included in the flooring arrangement 100 could have a different resistance to water or liquid penetration. For instance, the layer 140 could be water-resistant and/or water-repellent.

The damping layer 142 is disposed immediately beneath the water-proof membrane 140. The damping layer 142 is included for aiding in reducing noise and structural vibration from being transmitted into the cabin 20 through the floor arrangement 100. In the present embodiment, Deltane 350 is used as the damping layer 142. It is contemplated that other materials or products could be used, depending on the specific embodiment.

Figure 4:
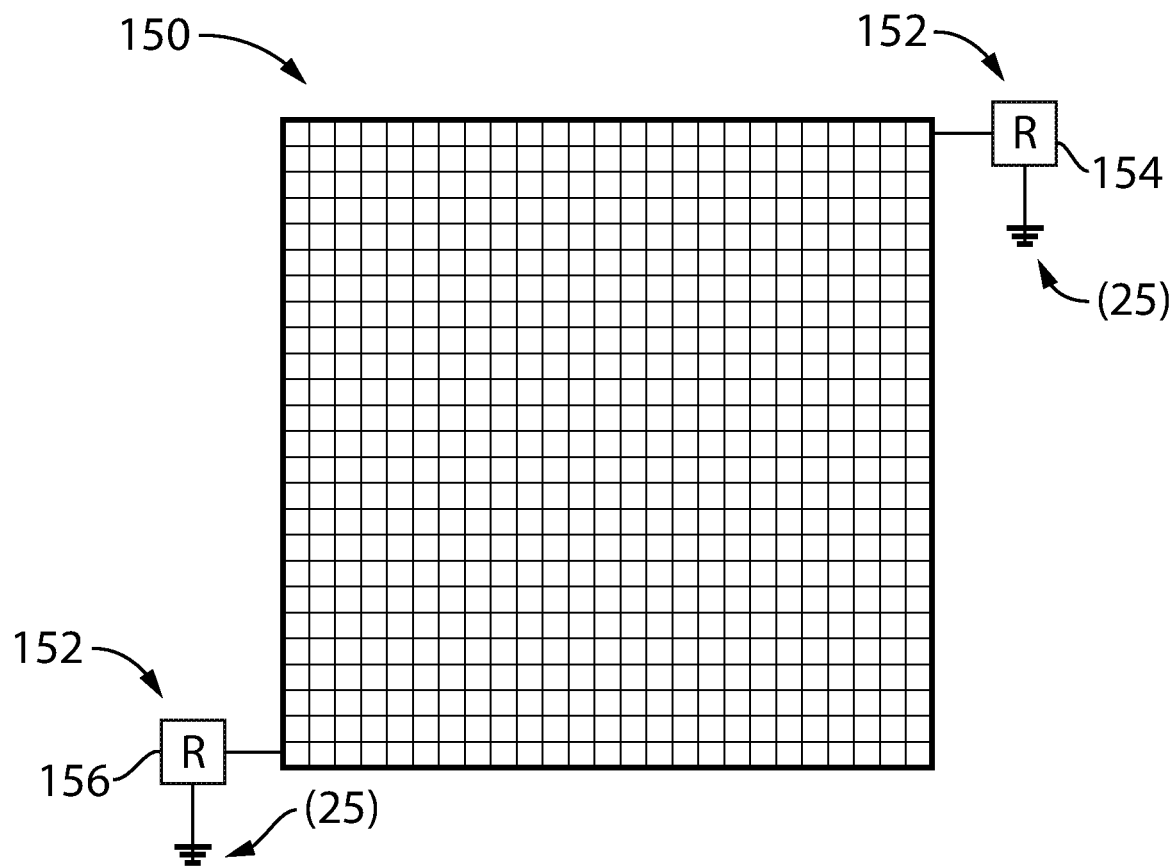
FIG. 4 is a schematic illustration of portions of the flooring arrangement of FIG. 3.

The wire mesh 150 of the flooring arrangement 100 will now be described in more detail with further reference to FIG. 4, where the wire mesh 150 is illustrated schematically. While referred to herein simply as the "wire mesh", it is also known as welded wire mesh, wire screen, and welded wire fabric. It is also contemplated that the wire mesh 150 could be implemented using metal grating or metal mesh sheet for example. It is also contemplated that the wire mesh 150 could be weaved into the carpet fabric layer 122 or integrated into the carpet backing 124 in some embodiments. It is further contemplated that the wire mesh 150 could be implemented in the form of a conductive sheet disposed immediately below the carpet layer 120, depending on the specific embodiment. The specific form of the conductive layer 150 could depend on various factors, including but not limited to: material of the layer 150, materials present in the carpet layer 120, and weight concerns for the overall flooring arrangement 100.

The wire mesh 150 is formed from metal wires loosely woven and welded together to form a sheet-like structure. While illustrated as being formed from wires oriented in two orthogonal directions, it is contemplated that the wire mesh 150 could have a variety of weave or overlay patterns. In the present embodiment, the metal wires are fabricated from anodized aluminum, but it is contemplated that the wire mesh 150 could be formed from one or different materials, including but not limited to: copper, plated nickel, and other low resistance materials treated to prevent corrosion. In the interest of minimizing weight added to the overall aircraft 10 by the wire mesh 150, the wires forming the wire mesh 150 are thin wires forming a 5 cm by 5 cm grid form in the present embodiment. It is contemplated that the grid formed by the wire mesh 150 could include a spacing of greater or less than 5 cm between wires. This is simply one non-limiting example, however, and larger wires or conductive material could be used in different embodiments.

The wire mesh 150 is disposed immediately below the carpet layer 120, between the carpet layer 120 and the cushioning and insulating layers 130, 140, 142. The wire mesh 150 forms a conductive layer in direct contact with the carpet layer 120, such that electrostatic charges that build up on the carpet layer 120 can conduct into the wire mesh 150. As charges cannot generally conduct laterally across the carpet layer 120, the wire mesh 150 contacts a bottom side of the carpet layer 120 across at least a majority of the width and length of the carpet layer 120.

The flooring arrangement 100 further includes electronic circuitry 152 for electrically connecting the wire mesh 150 to a conductive structure of the aircraft 10. In the present embodiment, the electronic circuitry 152 connects the wire mesh 150 to the conductive frame structure 25. In different embodiments, it is contemplated that the wire mesh 150 could connect to a different conductive structure, for instance metal structures extending under the flooring arrangement 100. The electronic circuitry 152 includes two resistive elements, specifically two resistors 154, 156, electrically connected between the wire mesh 150 and the frame structure 25 of the fuselage 12. The resistive elements 154, 156 allow flow of electric charge from the wire mesh 150, while preventing the free flow of rapid charges, as will be discussed in greater detail below.

The electronic circuitry 152 also includes a plurality of conductive wiring for connecting the resistors 154, 156 to the wire mesh 150 and to the conductive frame structure 25, including at least one disconnectable bonding strap for installing the flooring arrangement 100 in the aircraft 10. The conductive wiring, which generally form short conductive paths for connecting the wire mesh 150 to the conductive frame structure 25, are sometimes referred to as one or more jumpers. It is contemplated that the electronic circuitry 152 could include additional elements, depending on the particular embodiment, such as additional wiring, semiconductor elements, additional resistors, etc. It is also contemplated that one or both of the resistive elements connecting the wire mesh 150 to the conductive frame structure 25 could be replaced with different electronic elements depending on the embodiment, including but not limited to: resistor assemblies such as Wheatstone bridges, rheostats, capacitors, and diodes. It is also contemplated that additional resistive elements could be implemented depending on the embodiment.

The resistors 154, 156 are electrically connected to different extremities of the wire mesh 150. In the embodiment illustrated, one resistor 154 is connected to a front, right corner of the wire mesh 150 and the other resistor 156 is connected to a rear, left corner of the wire mesh 150. Locating the resistors 154, 156 at diametrically opposing corners aids in distributing the potential more uniformly across an entirety of the wire mesh 150, but this is simply one example embodiment. It is contemplated that the resistors 154, 156 could be disposed at the opposite corners, or in a different arrangement depending on the embodiment.

In the present embodiment, each resistor 154, 156 has a resistance of no more than about 5 mega-ohms (Me), such that electrostatic charge accumulated by the wire mesh 150 from the carpet layer 120 can dissipate, through the resistors 154, 156, away from the wire mesh 150 to the conductive frame structure 25. While lower resistance would allow accumulated charges to more rapidly dissipate away from the wire mesh 150, it would be disadvantageous to allow discharge from the conductive frame structure 25 to the wire mesh 150, especially for incidents of high current events and/or rapid electric impulses, i.e. lightning strikes on the aircraft 10 that may conduct through the conductive frame structure 25. In order to impede current flow due to electric impulses from the conductive frame structure 25, in the present embodiment each resistor 154, 156 has a resistance of at least about 1 Me. As such, incidents of high current, short electric impulse, such as lightning strikes, that impact the aircraft 10 are impeded from propagating from the conductive frame structure 25 to the wire mesh 150.

While in the present embodiment of the aircraft 10, the resistance of the resistive elements 154, 156 is limited to between about 1 and 5 Me, it is contemplated that this range may change depending on various details of a given embodiment. Several factors of the design of specific embodiments could impact the particular resistances to be used, including but not limited to: material composition of the wire mesh 150, material composition and/or arrangement of the frame structure 25, material composition of the carpet layer 120, and details related to the specific equipment risks of a given embodiment. In some embodiments, for example, each resistive element could have a minimum resistance of a few micro-ohms (me), and in some embodiments a maximum resistance of up to about 100 Me.

It should be noted that in some embodiments of the aircraft 10, the frame structure 25 may be non-conductive (i.e. fabricated from non-conductive material). In such a case, it is contemplated that the wire mesh 150 and the resistive elements 154, 156 could be connected to another conductive or grounding structure of the aircraft 10.

The specification is not intended to limit the aspects of implementations and embodiments of the present technology as recited in the claims below. Modifications and improvements to the above-described implementations and embodiments of the present technology may become apparent to those skilled in the art. The foregoing description is intended to be exemplary rather than limiting.

What is claimed is:

1. A flooring arrangement for a cabin of an aircraft, the flooring arrangement comprising:
   at least one insulating layer for insulating the cabin;
   a wire mesh disposed above the at least one insulating layer;
   a carpet layer disposed above the wire mesh, the carpet layer and the wire mesh being in electrically conductive contact; and
   at least one resistive element connected to the wire mesh, the wire mesh being structured and arranged for being electrically connected to a conductive structure of the aircraft via the at least one resistive element,
   wherein the at least one resistive element comprises:
   a first resistor electrically connected at a first location on the wire mesh; and
   a second resistor electrically connected at a second location on the wire mesh,
   the first location and the second location being disposed on opposite ends of the wire mesh.

2. The flooring arrangement of claim 1, wherein, when the flooring arrangement is installed in the aircraft, the at least one resistive element is adapted to:
   allow transmission, from the wire mesh to the conductive structure, of electrostatic charges developed on the carpet layer, and impede transmission, from the conductive structure to the wire mesh, of high current events experienced by the aircraft.

3. The flooring arrangement of claim 1, wherein the first location and the second location are diametrically opposing corners of the wire mesh.

4. The flooring arrangement of claim 1, wherein at least one of the first resistor and the second resistor has a resistance of at least about one mega-ohm.

5. The flooring arrangement of claim 1, wherein the at least one of the first resistor and the second resistor has a resistance equal to or less than about five mega-ohms.

6. The flooring arrangement of claim 1, wherein the at least one insulating layer includes at least one damping layer.

7. The flooring arrangement of claim 1, further comprising at least one waterproof membrane disposed below the wire mesh.

8. An aircraft comprising:
a fuselage defining a cabin therein; and
a pair of oppositely disposed wing assemblies connected to the fuselage,
the fuselage comprising:
a conductive structure; and
a flooring arrangement for the cabin, the flooring arrangement comprising:
at least one insulating layer for insulating the cabin;
a wire mesh disposed above the at least one insulating layer;
a carpet layer disposed above the wire mesh, the carpet layer and the wire mesh being in electrically conductive contact; and
at least one resistive element connected to the wire mesh,
the wire mesh being electrically connected to a conductive structure of the fuselage through the at least one resistive element,
wherein the at least one resistive element comprises:
a first resistor electrically connected at a first location on the wire mesh; and
a second resistor electrically connected at a second location on the wire mesh,
the first location and the second location being disposed on opposite sides of the wire mesh.

9. The aircraft of claim 8, wherein the at least one resistive element is adapted to:
allow transmission, from the wire mesh to the conductive structure, of electrostatic charges developed on the carpet layer, and
impede transmission, from the conductive structure to the wire mesh, of high current events experienced by the aircraft.

10. The aircraft of claim 8, wherein the conductive structure includes at least portions of the fuselage.

11. The aircraft of claim 8, wherein the first location and the second location are diametrically opposing corners of the wire mesh.

12. The aircraft of claim 8, wherein the at least one of the first resistor and the second resistor has a resistance of at least about one mega-ohm.

13. The aircraft of claim 8, wherein the at least one of the first resistor and the second resistor has a resistance equal to or less than about five mega-ohms.

14. The aircraft of claim 8, wherein the at least one insulating layer of the flooring arrangement includes at least one damping layer.

15. The aircraft of claim 8, wherein the flooring arrangement further comprises at least one water-resistant membrane disposed below the wire mesh.

* * * * *

UNITED STATES PATENT AND TRADEMARK OFFICE
CERTIFICATE OF CORRECTION

| | |
|---|---|
| PATENT NO. | : 11,485,470 B2 |
| APPLICATION NO. | : 16/891922 |
| DATED | : November 1, 2022 |
| INVENTOR(S) | : Fidele Moupfouma et al. |

It is certified that error appears in the above-identified patent and that said Letters Patent is hereby corrected as shown below:

In the Claims

Column 9, Claim 5, Lines 11-12 should read --The flooring arrangement of claim 1, wherein at least one of the first resistor and the second resistor has a--
Column 10, Claim 12, Lines 24-25 should read --The aircraft of claim 8, wherein at least one of the first resistor and the second resistor has a resistance of at--
Column 10, Claim 13, Lines 27-28 should read --The aircraft of claim 8, wherein at least one of the first resistor and the second resistor has a resistance equal to--

Signed and Sealed this
Twentieth Day of December, 2022

Katherine Kelly Vidal
*Director of the United States Patent and Trademark Office*